June 12, 1962 D. M. ZABRISKIE 3,039,104

COPY MARKER IN FACSIMILE APPARATUS

Filed July 11, 1960 7 Sheets-Sheet 1

INVENTOR.
D. M. ZABRISKIE
BY J. B. Burke
ATTORNEY

COPY MARKER IN FACSIMILE APPARATUS

Filed July 11, 1960 7 Sheets-Sheet 2

June 12, 1962 D. M. ZABRISKIE 3,039,104

COPY MARKER IN FACSIMILE APPARATUS

Filed July 11, 1960 7 Sheets-Sheet 3

June 12, 1962 D. M. ZABRISKIE 3,039,104

COPY MARKER IN FACSIMILE APPARATUS

Filed July 11, 1960 7 Sheets-Sheet 4

COPY MARKER IN FACSIMILE APPARATUS

Filed July 11, 1960 7 Sheets-Sheet 5

June 12, 1962 D. M. ZABRISKIE 3,039,104

COPY MARKER IN FACSIMILE APPARATUS

Filed July 11, 1960 7 Sheets-Sheet 7

United States Patent Office 3,039,104

Patented June 12, 1962

3,039,104

COPY MARKER IN FACSIMILE APPARATUS

Douglas M. Zabriskie, Northvale, N.J., assignor to The Western Union Telegraph Company, New York, N.Y., a corporation of New York Filed July 11, 1960, Ser. No. 41,925
9 Claims. (Cl. 346—100)

This invention relates to the art of facsimile apparatus and more particularly concerns a marking device for copy scanned or recorded upon in facsimile apparatus.

A particular need has developed in the art of scanning cards, tickets and other copy in sheet form in facsimile apparatus, for identifying the particular machine in which the copy has been scanned or recorded and for determining positively that the copy has been fully scanned in the apparatus during a copy transmission period. It is required that the copy be marked in a permanent and indelible manner with a coded marking, by the apparatus itself in an automatic manner. Thus human errors such as failing to transmit a piece of copy over a facsimile system, failing to note whether or not a particular piece of copy has been scanned and transmitted, and failing to note which machine performed the scanning or recording, are all avoided.

The present invention meets the above requirements by providing a device which is electromechanically operated to perforate copy with an initial perforation at the beginning of scanning or recording and to complete the perforation at the end of scanning or recording. The characteristic size, number and spacing of the perforations identify the machine in which scanning or recording was performed and provide a positive indication that the copy has been scanned or recorded in the assigned machine.

The present invention is especially adapted for use in facsimile scanning and recording apparatus of the types described in United States Patents 2,872,275 and 2,894,063, but it may be used in other scanning and recording apparatus of similar character. In the above mentioned types of facsimile apparatus, a copy sheet in the form of a card or ticket is automatically wrapped around a drum after the sheet is inserted into the machine and operation of machine initiated. According to the invention, there is provided a marking device in the form of an arm carrying a blade having a plurality of projecting teeth. One tooth of the marking device enters the copy sheet after the copy is wound on the drum as scanning or recording begins. At the end of scanning or recording the copy sheet is automatically unwound whereupon the other teeth of the marking device are forced in succession into the copy sheet to impress therein permanent and characteristic marks uniquely identified with the particular machine in which marking occurred. The marks may be uniquely coded by the size, number and spacing of the perforations made in the copy sheet. In order to actuate the marking device initially, there is provided a solenoid in the apparatus which lifts a bail and tilts the arm to perforate the copy sheet initially. After scanning is completed, the bail is retracted while the unwinding of the copy sheet draws the marking arm angularly to effect the complete marking of the copy sheet.

The objects of the invention are, therefore, to provide means for code marking copy in a facsimile scanner or recorder in a permanent and indelible and unique manner; to provide means for automatically code perforating copy in a facsimile device at the end of scanning or recording; to provide a coded marking device operable in association with an automatic copy wrapping and unwrapping device in a facsimile apparatus; and to provide a facsimile apparatus with means for perforating copy with holes characterized by their number, size and spacing to identify the particular apparatus in which perforation was performed and to indicate positively and permanently that the copy has been processed in particular apparatus.

The invention will be explained in further detail in connection with the drawings, wherein.

Figure 11:
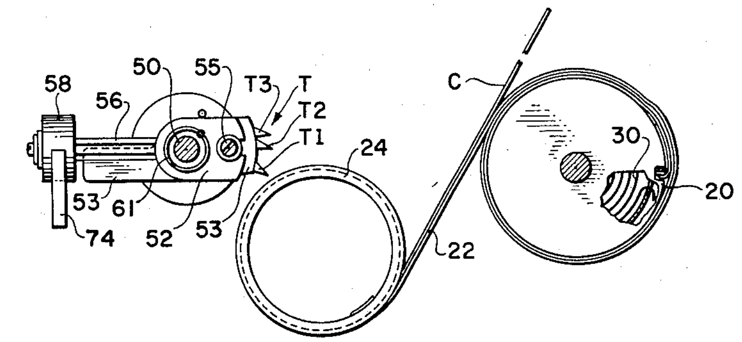
FIGS. 11, 12 and 13 are end elevational views of a portion of the copy sheet wrapper mechanism with the marker shown in successive positions perforating the card.
Figure 12:
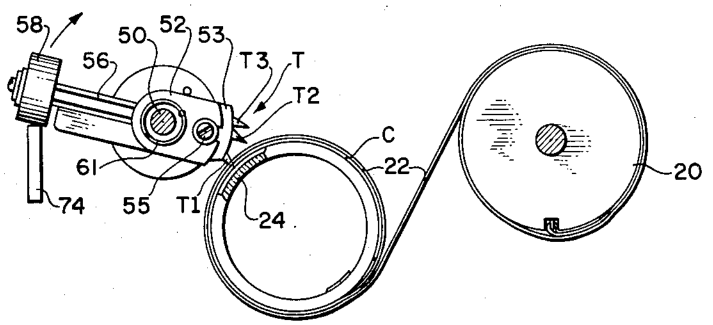

The apparatus shown in FIGS. 1–7 includes a base 10 covered with a removable cover 12, part of which is broken away to show internal parts. The apparatus includes a rotatable drum 20 shown in FIGS. 1–7. One end of a wrapper belt 22 is secured to drum 20. The other end of the belt is secured on a transparent rotatable drum 24 supported on a carriage 25. A stallable reversible motor 26 is mounted on carriage extension 23. Drum 24 is driven by motor 26 via a belt 28. Belt 28 is entrained on sprockets **28*a*, 28*b*. The sprocket 28*b* is engaged with drum 24 which is rotatable, for about 360° to wind the belt up on the drum 24 while unwinding the belt from drum 20 against increasing tension in a coil spring 30 in drum 20; see FIGS. 7 and 11. The motor shaft 27 is stalled in this position by contact between a projection thereon with a fixed stop member (not shown). It is intended that a flexible card, ticket, or other piece of copy sheet to be scanned in the device, be placed in chute 32 under which passes belt 22. The card will be wound up on drum 24 between the belt and drum when motor 26** is driven upon closing of its power supply circuit. The wrapper mechanism described is similar in its essential construction to wrapper mechanism disclosed in U.S. Patent 2,872,275 issued to R. J. Wise et al. and in U.S. Patent 2,894,063 issued to G. H. Ridings et al.

Figure 1:
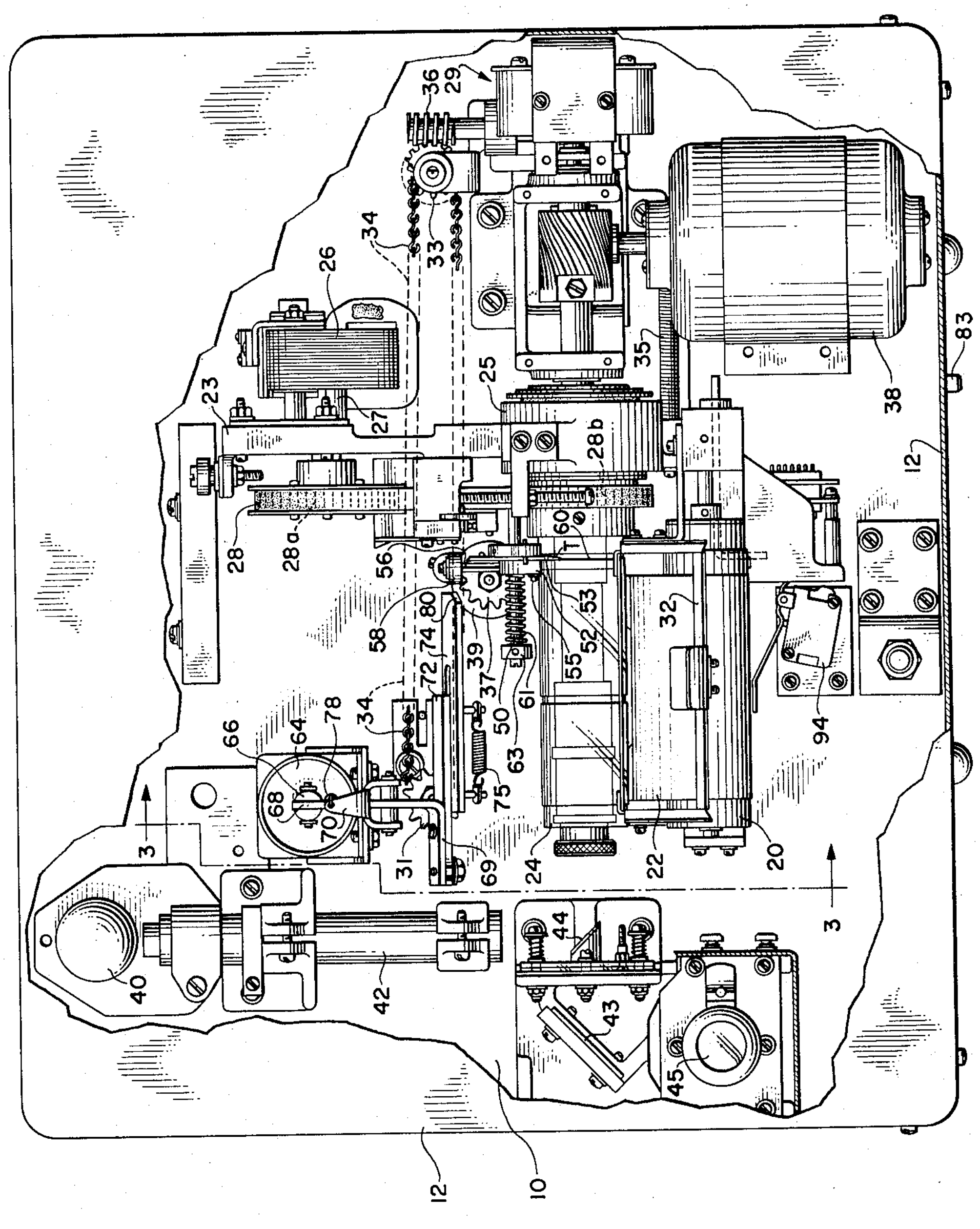
FIG. 1 is a top plan view of an apparatus embodying the invention, a portion of a cover thereof being broken away to show internal parts.
Figure 2:
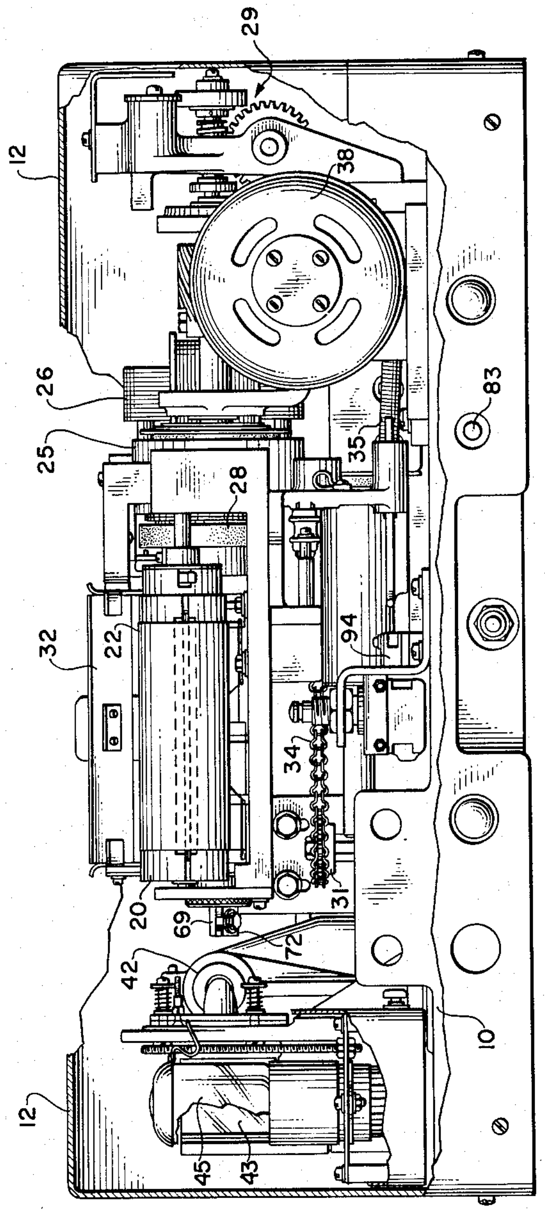
FIG. 2 is a front elevational view of the apparatus with another portion of the cover broken away.
Figure 3:
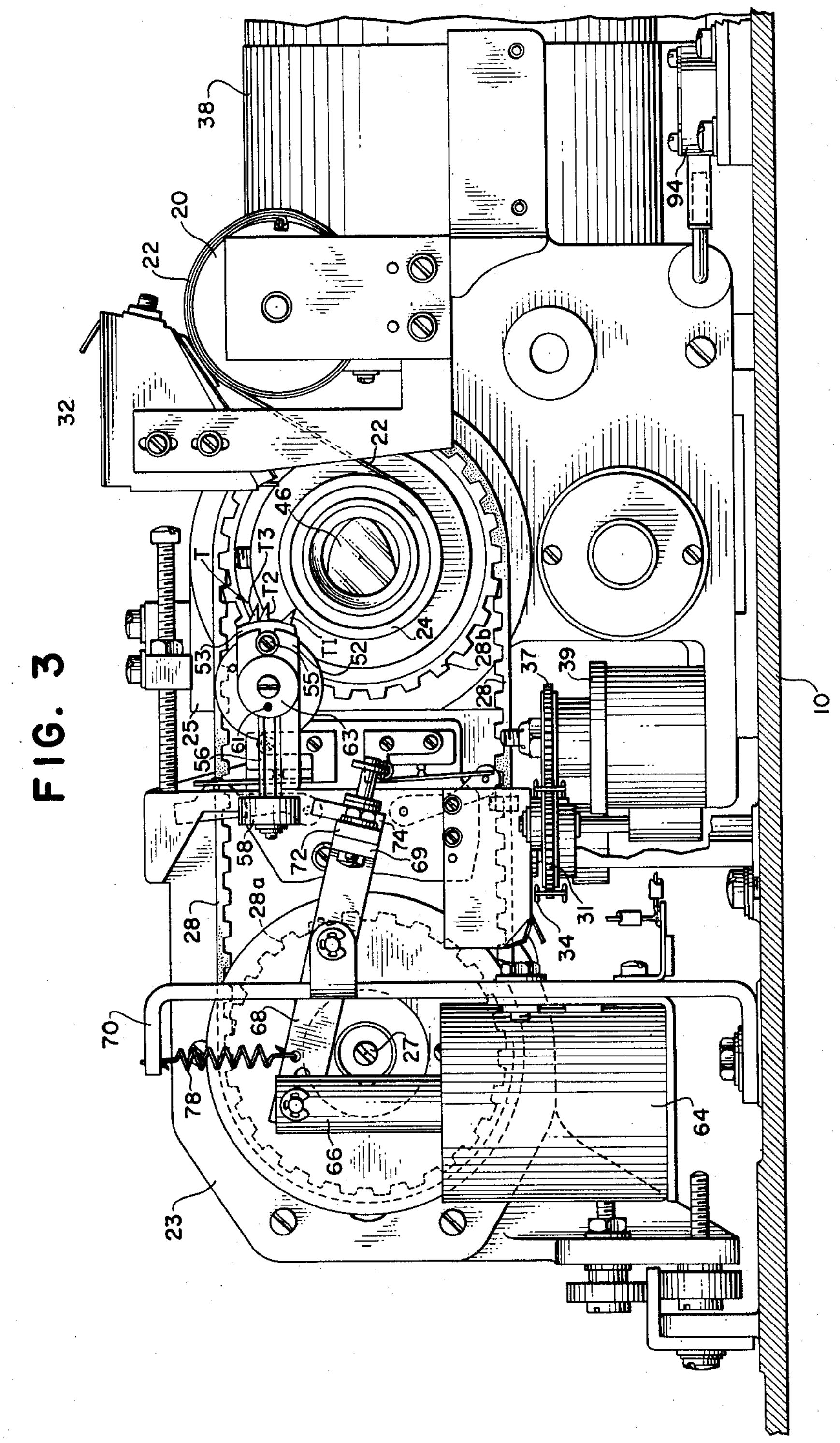
FIG. 3 is a vertical sectional view on an enlarged scale taken on line 3—3 of FIG. 1.
Figure 4:
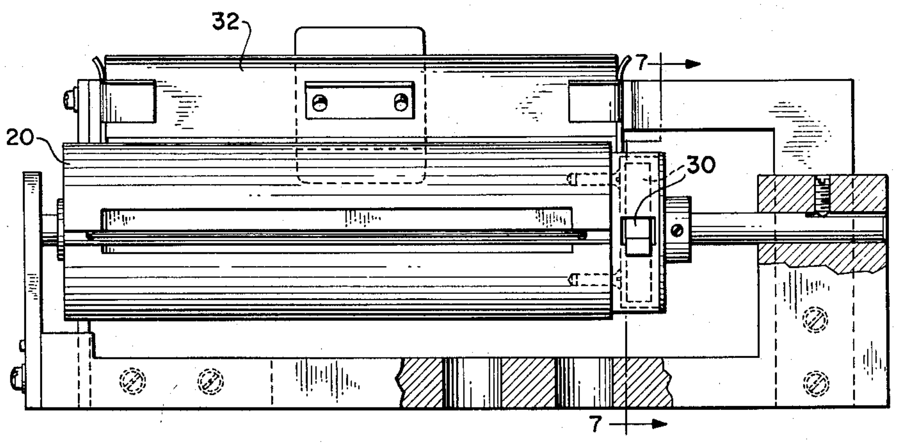
FIG. 4 is a top plan view of a portion of the copy sheet wrapper mechanism.
Figure 5:
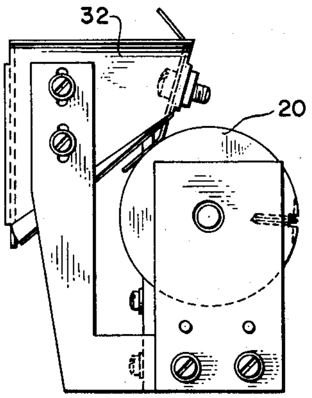
FIGS. 5 and 6 are elevational views of opposite ends respectively of the portion of the copy sheet wrapper mechanism shown in FIG. 4.
Figure 6:
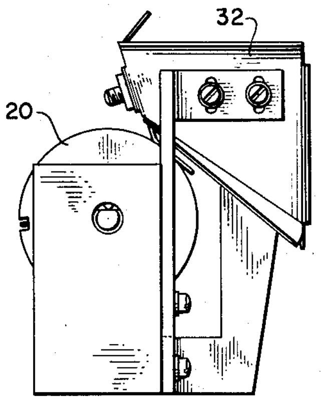
Figure 7:
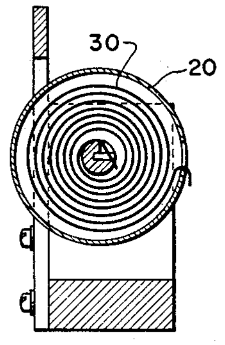
FIG. 7 is a sectional view taken on line 7—7 of FIG. 4.

While the card C is being wrapped on the drum 24, endless chain 34 is being driven via sprockets 31, 33, worm 36, gear box 29 and carriage motor 38. A magnetic clutch 39 is interposed between sprocket 37 which engaged chain 34, and carriage 25 which carries drum 24 and moves it axially from right to left as seen in FIGS. 1 and 2 when the clutch is energized and engaged. A retractile spring 35 serves to return the carriage to its initial position at the right when the clutch disengages the carriage from the chain drive.

The message side of the card C faces the transparent drum 24 and this side is scanned by means of a photoelectric scanning system including a lamp 40, light conducting tube 42, mirrors 43 and 44 and photoelectric cell 45. A mirror 46 rotates within the drum 24 for scanning the message while the drum 24 is moved axially. This scheme of scanning a message on a piece of copy is described in detail in U.S. Patent 2,894,065 issued to R. J. Wise et al.

The improvement embodying the present invention involves a marker device shown to best advantage in FIGS. 1, 3 and 11–13. The marker has a cylindrical shaft 50 on which is rotatably mounted a hub 52. A marker blade 53 is adjustably mounted on the hub by means of screw 55. The blade has a predetermined number of teeth T arranged on the forwardly extending edge of the blade. The teeth have a predetermined spacing so that an array of perforations characteristic of the particular arrangement of teeth on the marker will be made in a card after it has been scanned in the apparatus.

A bar 56 extends rearwardly from the hub and carries a freely rotatable roller 58 at its rear end. A groove 60 is circumferentially formed in the drum 24 in coplanar alignment with the teeth of blade 53 so that the teeth can penetrate in turn through the body of the card into the groove while the card is being unwrapped from drum 24.

A coil spring 61 is secured to hub 52 at one end, and to shaft 50 at the other end by means of collar 63. This spring biases the marked blade upwardly away from drum 24.

In order to pivot the marker blade toward drum 24 there is provided a solenoid mechanism best shown in FIGS. 1–3 and 8–10. The solenoid 64 has an axial plunger which extends upwardly out of the solenoid. A bar 68 pivotally carried by a frame member 70 is pivotally secured at its rear end to plunger 66. Bar 68 is bent at 69 at its forward end to provide a support for a rail 72. A bail 74 is slidably carried by the rail and can be moved in its plane to the left against tension in spring 75, as viewed in FIGS. 1, 8 and 9. A spring 78 is connected between a bent end 79 of frame member 70 and the rear end of the bar 68 for lowering the bail when the solenoid is deenergized. The bail 74 has a beveled corner 80 to facilitate the rolling of the roller 58 up on the bail.

Figures 8, 9, 10:
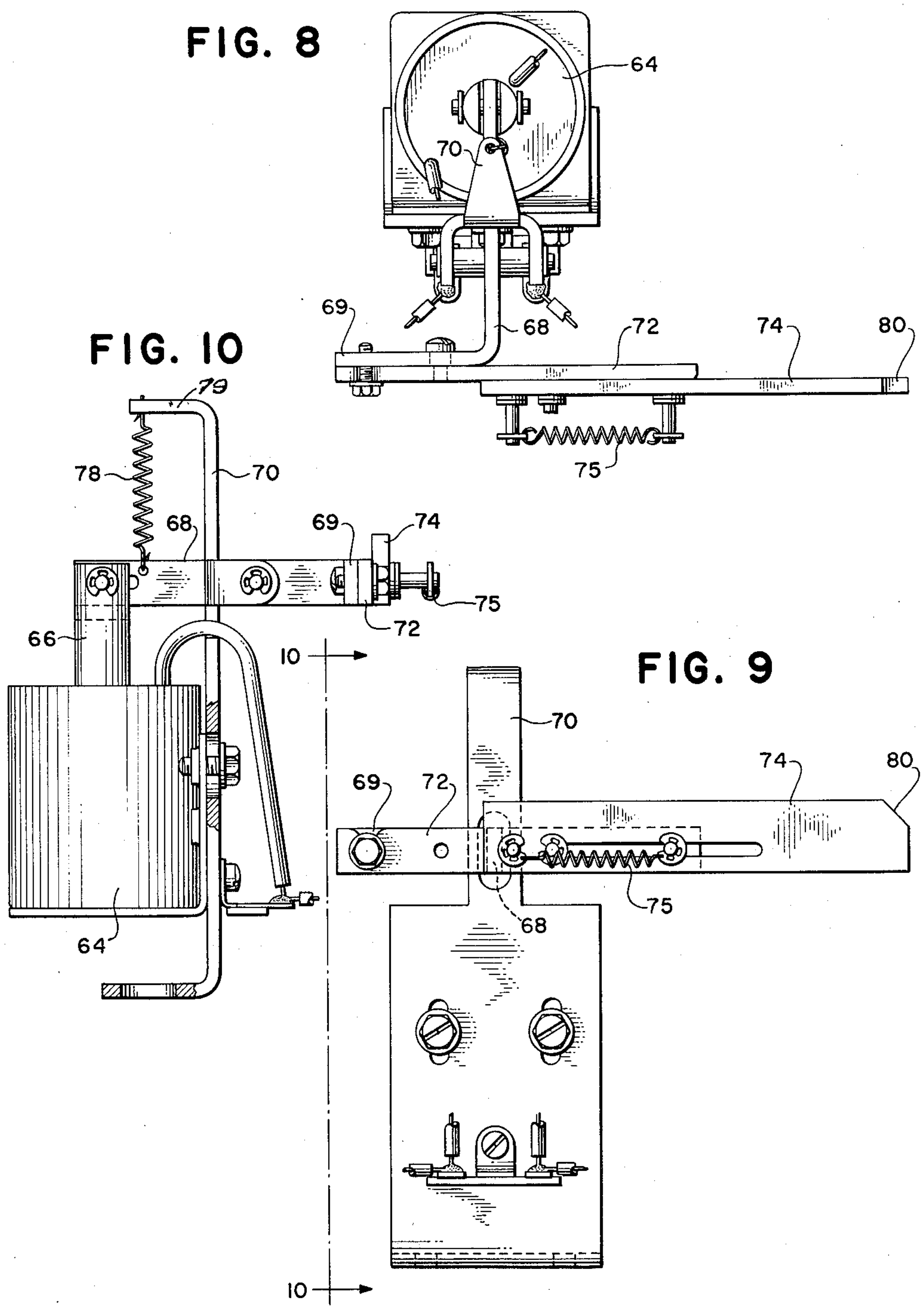
FIG. 8 is a top plan view of the solenoid mechanism of the marker.
FIGS. 9 and 10 are front and side elevational views respectively of the solenoid mechanism.

In operation of the mechanism, bail 74 will be initially extended to its maximum extent to the right toward the marker in the positions shown in FIGS. 1, 8 and 9. It will be noted that the beveled corner 80 is closed to the roller 58. Suppose now that a card C is inserted into the chute 32 on to belt 22 and is rolled up on drum 24. The right end of the card will overlap the groove 60 which is located to the right of and clear of belt 22. The first tooth T1 of the marker will be slightly spaced from and just above the card in the position shown in FIG. 11. Motor 26 will then be stalled holding the drum 24 and belt 22 in wound condition.

The apparatus may now start scanning the message side of the card. The scanning members form no part of the present invention and are described in the above-mentioned United States Patents 2,872,275; 2,894,063; and 2,894,065. As soon as the scanning starts drum 24 on its carriage 25 begins to be drawn to the left and solenoid 64 becomes energized to raise bail assembly 74, 74, whereupon roller 58 rides up over corner 80 on to bail 74. This causes an angular movement of the marker and forces the first tooth T1 to enter through the card C into groove 60. This is the first perforation position of the card and marker shown in FIG. 12. Now the drum 24 and marker ride together to the left while the card is scanned in the apparatus. The solenoid 64 remains energized during the axial movement of the drum 24 during its scanning period. When the drum 24 reaches its end of travel, scanning is completed so that the solenoid becomes deenergized and the bail 74 is dropped. At the same time the stalled motor 26 is reversed and the drum 20 begins to unwind the belt 22 from drum 24. The belt is maintained under tension by the tensioned coil spring 30 in the drum 20. The card C moves counter clockwise with belt 22 as viewed in FIG. 13 and one tooth after another is forced to penetrate the card as the marker blade rotates clockwise, all as viewed in FIG. 13. It is the engagement of one tooth after another in the card which causes the marker to be drawn clockwise. After the last tooth has marked the card, the card slips clear of the last tooth and the marker is released to retract to its initial rest position shown in FIG. 11. The unwound card passes up the chute to a position where it can be manually grasped and removed.

Figures 13, 14:
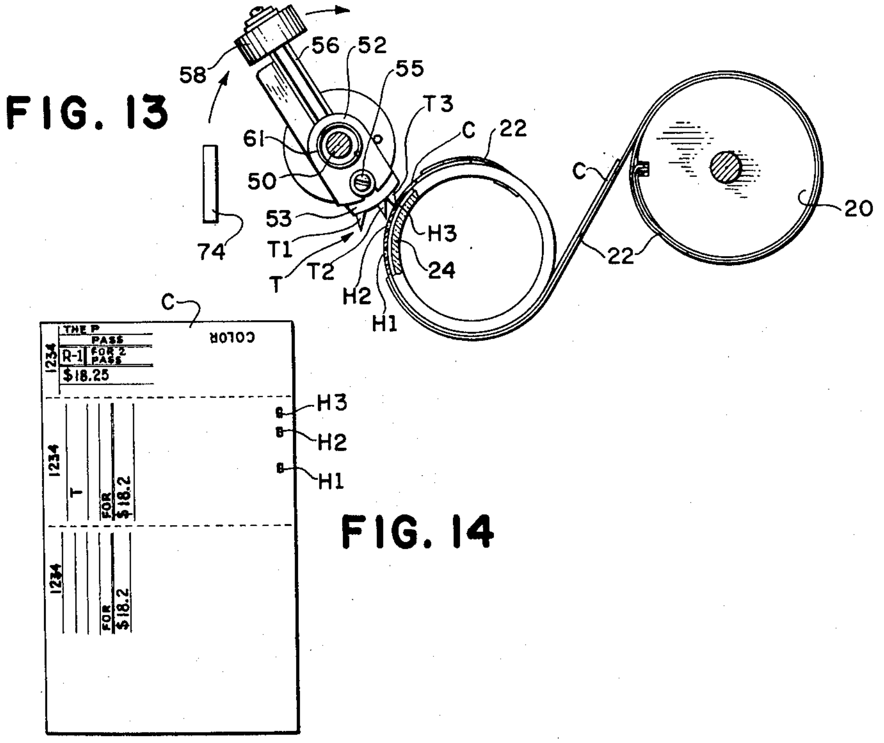
FIG. 14 is a plan view of a copy sheet in the form of a card after being marked with perforations in the apparatus.

FIG. 13 shows three holes H1, H2 and H3 formed in the card C by the three teeth T1, T2, T3 respectively. The number and spacing of the holes corresponds to the number and spacing of the teeth T on the marker blade 53. If more or less teeth are employed, then a corresponding number and spacing of holes will appear in the card. An unperforated area appears on card C between holes H1 and H2 corresponding to the spacing of teeth T1 and T2.

This coded perforating of the card is an indication that the card has been subjected to a scanning operation and the coding of the perforations identifies the particular apparatus in which the scanning operation was performed.

Figure 15:
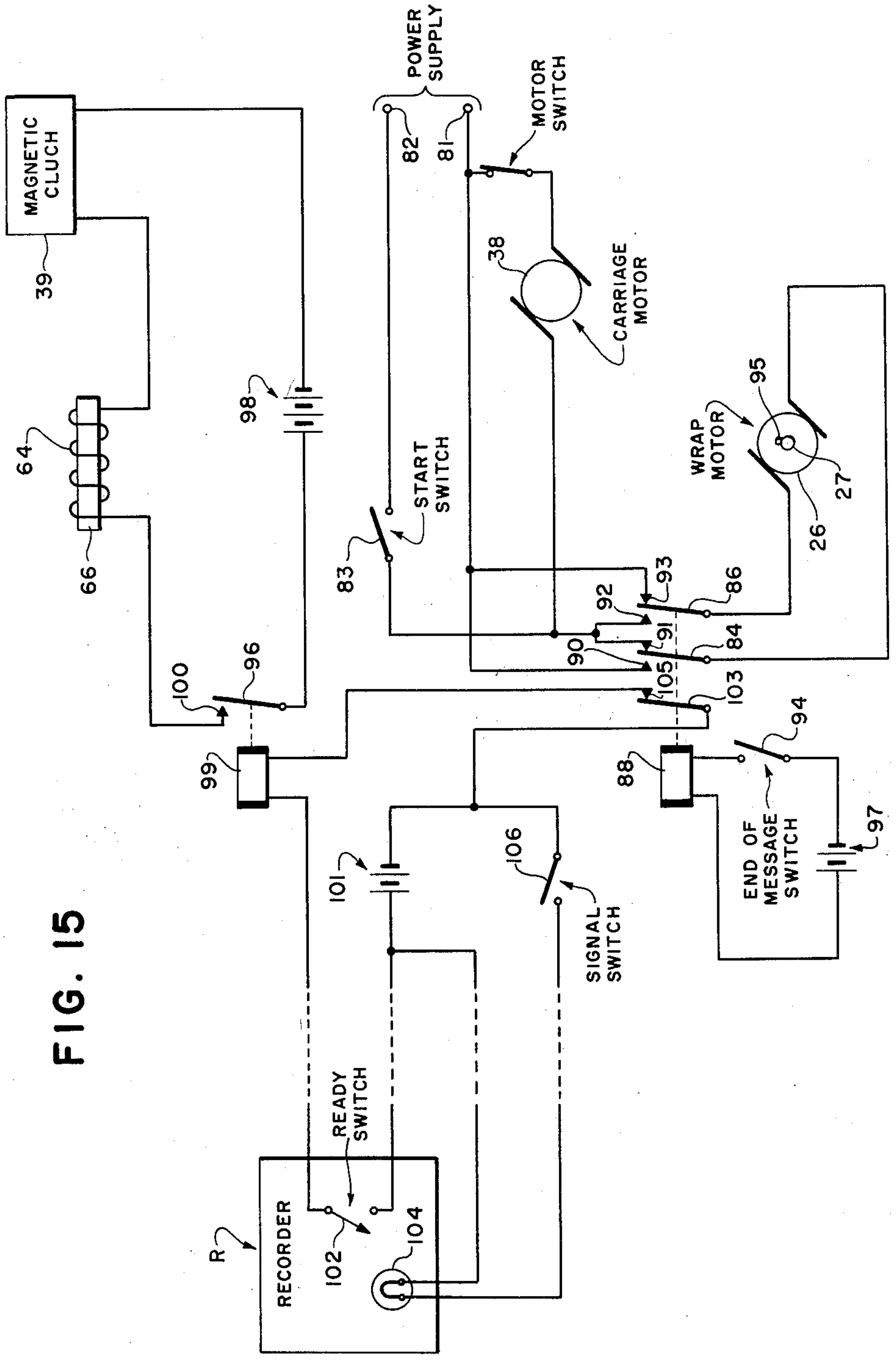
FIG. 15 is a simplified circuit diagram of a portion of the operative circuit of the apparatus.

FIG. 15 shows schematically in simplified form the portion of the electrical circuit essential to the operation of the invention. A start switch 83 is disposed at the front of the apparatus for manual actuation by the operator. This switch is connected to power supply terminals 81, 82. Carriage motor 38 is connected to power supply terminals 81, 82 via switch 83. Wrap motor 26 is connected to movable poles or contacts 84, 86 of relay 88. Shaft 27 of this motor will rotate in one direction or another depending on the position of contacts 84, 86 with respect to fixed contacts 90, 91 and 92, 93 of relay 88. The shaft carries a projecting stop element 95. Contacts 90, 93 are connected to terminal 81 and contacts 92, 92 are connected to terminal 82. An end of message switch 94 is provided in the apparatus and is disposed in series with relay 88 and battery 97.

Solenoid 64 is in series with magnetic clutch 39 and is energized by a battery 98 in series with contacts 96, 100 of relay 99. Relay 99 is energized via a "Recorder Ready" switch 102 located at a recorder R to which the facsimile message is to be transmitted, battery 101 and contacts 103, 105 of relay 88. A signal lamp, or other signaling device 104 is located at the recorder and is in circuit with a signal switch 106 and battery 101 at the transmitter apparatus.

Suppose now that a card C bearing a message to be scanned is inserted into chute 32 onto belt 22. The start switch 83 is closed which energizes the wrap motor 26 and the belt 22 carrying the card wraps the card around drum 24. When the card is fully wound up, the stop element 95 engages a fixed stop member (not shown) in the apparatus and the shaft of motor 26 is stalled mechanically. The carriage motor 38 is started when switch 83 closes and drives chain 34 on sprockets 31, 33. Clutch 39 is meanwhile deenergized so that the carriage 25 remains in its initial retracted position held by spring 35. Switch 106 is now manually or automatically closed signaling the recorder that the transmitter apparatus is ready to transmit a facsimile message. The switch 102 at the recorder then is closed manually or automatically and relay 99 becomes energized via battery 101 and closed contacts 103, 105 of relay 88. When relay 99 is energized contacts 96, 100 close and the solenoid 64 is energized to retract plunger 66 and lift bail assembly 72, 74. At the same time clutch 39 is energized to operatively connect the carriage 25 with chain 34, and the carriage 25 moves to the left. Roller 58 on the marker assembly moves up on the bail 74 and the first tooth T1 of marker blade 53 is forced into the card C into groove 60 of drum 24.

Carriage 25 is now driven to the left while the message on card C exposed to the interior of transparent drum 24 is scanned electro-optically in the manner described in detail in the above mentioned patents. When the carriage reaches its end of travel at the left, the end of message switch 94 is closed which energizes relay 88. Contacts 103, 105 open to deenergize relay 99. Contacts 96, 100 open to deenergize solenoid 64 and clutch 39. Contacts 84, 91 and 86, 93 open while contacts 84, 90 and 86, 92 close. This reverses the power supply of motor 26 so that it rotates shaft 27 and drum 24 in the reverse direction, unwinding belt 22 from drum 24 and pulling card C with it. As the card is unwrapped from drum 24, the teeth of marker blade 33 are successively forced into the card to produce the coded perforations H1—H3 desired. Spring 35 retracts to draw the carriage 25 back to the right to its starting position. Card C is moved up the chute where it can be withdrawn.

Although the invention has been explained with particular reference to a facsimile scanning apparatus it will be understood that it is equally applicable to a facsimile recording apparatus.

The terms "copy" and "copy sheet" are employed in this specification and the claims shall be construed to indicate any flexible sheet material such as a ticket, card, paper sheet, tape etc.

While the invention has been described in connection with a preferred embodiment it is not limited thereto and is to be construed as coextensive with the broadest of the appended claims.

I claim:

1. In a facsimile apparatus, in combination, a rotatable drum axially movable and non-rotatable during scanning of a copy sheet thereon, means for automatically wrapping said copy sheet on the drum before scanning and for unwrapping the sheet from the drum after scanning, a perforation device disposed adjacent to the drum and movable therewith, means for moving the drum axially, and means for actuating said device to perforate the sheet with an initial perforation after said sheet is wrapped on the drum and axial movement begins at the start of scanning, and means for perforating the sheet with at least one another perforation as the sheet is being unwound from the drum at the end of axial movement thereof after scanning of the sheet is completed.

2. In a facsimile apparatus, in combination, a rotatable drum, means for wrapping a sheet of copy on the rotatable drum and for unwrapping the sheet from the drum, a perforation device disposed adjacent to the drum, said device including a pivotally mounted arm, a blade carried at the end of the arm, said blade having a plurality of spaced teeth arranged arcuately for piercing the sheet, and means for actuating the device to perforate the sheet on the drum with a first perforation; the last named means including a bail, and a solenoid operatively connected to the bail to tilt the same and pivot the arm so that one of the teeth pierces the sheet and remains engaged therein, whereby the remainder of the teeth are drawn in succession into the sheet as the sheet is unwound from the drum.

3. In a facsimile apparatus in combination, a rotatable drum axially movable and non-rotatable during scanning of a copy sheet thereon, means for automatically wrapping said copy sheet on the drum before scanning and for unwrapping the sheet from the drum after scanning, a perforation device disposed adjacent to the drum and movable therewith, said device including a pivotally mounted arm, a blade carried at the end of the arm, said blade having a plurality of spaced teeth arranged arcuately for piercing the sheet, means for actuating the device to perforate the sheet on the drum with a first perforation after said sheet is wrapped on the drum and axial movement thereof begins; the last named means including a bail, and a solenoid operatively connected to the bail to tilt the same and pivot the arm so that one of the teeth pierces the sheet and remains engaged therein, whereby the remainder of the teeth are drawn in succession into the sheet as the sheet is unwound from the drum.

4. In a facsimile apparatus in combination, a rotatable drum axially movable and non-rotatable during scanning of a copy sheet thereon, means for automatically wrapping said copy sheet on the drum before scanning and for unwrapping the sheet from the drum after scanning, a perforation device disposed adjacent to the drum and movable therewith, said device including a pivotally mounted arm, a blade carried at the end of the arm, said blade having a plurality of spaced teeth arranged arcuately for piercing the sheet, and means for actuating the device to perforate the sheet on the drum with a first perforation after said sheet is wrapped on the drum and axial movement thereof begins; the last named means including a bail, and a solenoid operatively connected to the bail to tilt the same and pivot the arm so that one of the teeth pierces the sheet and remains engaged therein, whereby the remainder of the teeth are drawn in succession into the sheet as the sheet is unwound from the drum, said drum having a circumferential groove disposed in coplanar alignment with said blade for receiving said teeth as the teeth perforate the sheet.

5. In a facsimile apparatus having an axial movable rotatable drum and means for automatically wrapping a copy sheet on the drum and for unwrapping the sheet from the drum, in combination: a multiple tooth perforation device disposed adjacent to the drum, and electromechanical means for engaging one tooth of the device in the sheet when axial movement of the drum starts, the teeth of said device being movable to pierce the sheet in succession as the sheet is being unwound from the drum by the first named means at the end of axial movement of the drum.

6. In a facsimile apparatus in combination, a rotatable drum axially movable and non-rotatable during scanning of a copy sheet thereon, means for automatically wrapping said copy sheet on the drum before scanning and for unwrapping the sheet from the drum after scanning, a perforation device disposed adjacent to the the drum and movable therewith, said device including a pivotally mounted arm, a blade carried at the end of the arm, said blade having a plurality of spaced teeth arranged arcuately for piercing the sheet, and means for actuating the device to perforate the sheet on the drum with a first perforation after said sheet is wrapped on the drum and axial movement thereof begins; the last named means including a bail, a solenoid operatively connected to the bail to tilt the same and pivot the arm so that one of the teeth pierces the sheet and remains engaged therein, whereby the remainder of the teeth are drawn in succession into the sheet as the sheet is unwound from the drum, and means in circuit with said solenoid and the copy sheet wrapping and unwrapping means, the circuit means being responsive to a first signal after the sheet is wrapped on the drum to actuate the solenoid and lift the bail, said circuit means being responsive to a second signal upon completion of scanning of said sheet to deenergize the solenoid for retraction of the bail and to actuate the sheet unwrapping means.

7. In a facsimile apparatus in combination, a rotatable drum axially movable and non-rotatable during scanning of a copy sheet thereon, means for automatically wrapping said copy sheet on the drum before scanning and for unwrapping the sheet from the drum after scanning, a perforation device disposed adjacent to the drum and movable therewith, said device including a pivotally mounted arm, a blade carried at the end of the arm, said blade having a plurality of spaced teeth arranged arcuately for piercing the sheet, and means for actuating the device to perforate the sheet on the drum with a first perforation after said sheet is wrapped on the drum and axial movement thereof begins; the last named means including a bail, and a solenoid operatively connected to the bail to tilt the same and pivot the arm so that one of the teeth pierces the sheet and remains engaged therein, whereby the remainder of the teeth are drawn in succession into the sheet as the sheet is unwound from the drum, said drum having a circumferential groove disposed in coplanar alignment with said blade for receiving said teeth as the teeth perforate the sheet; and means in circuit with said solenoid and copy sheet wrapping and unwrapping means, the circuit means being responsive to a first signal to wrap the sheet on the drum, to a second signal to actuate the solenoid and lift the bail, and to a third signal upon completion of scanning of said sheet to deenergize the solenoid for retraction of the bail and to actuate the sheet unwrapping means.

8. In a facsimile apparatus, the combination, a rotatable drum, means for wrapping a sheet of copy on the drum and for unwrapping the sheet from the drum, a perforation device disposed adjacent to the drum and actuating said device to perforate the sheet with a first perforation after the sheet is wrapped on the drum and to perforate the sheet with at least one other perforation as the sheet is being unwound from the drum, and circuit means operatively connected to the sheet wrapping and unwrapping means and perforation device actuating means and responsive to signals to actuate the sheet wrapping and unwrapping means and perforation device actuating means.

9. In a facsimile apparatus, in combination, a rotatable drum axially movable and non-rotatable during scanning of a copy sheet thereon, means for automatically wrapping said copy sheet on the drum before scanning and for unwrapping the sheet from the drum after scanning, a perforation device disposed adjacent to the drum and movable therewith, means for moving the drum axially, means for actuating said device to perforate the sheet with an initial perforation after said sheet is wrapped on the drum and axial movement begins at the start of scanning and to perforate the sheet with at least one other perforation as the sheet is being unwound from the drum at the end of axial movement thereof after scanning of the sheet is completed, and circuit means operatively connected to the copy sheet wrapping and unwrapping means, the drum moving means, and the perforation device actuating means, said circuit means being responsive to successively applied signals to wrap the copy sheet on the drum, to move the drum axially, to actuate the perforation device actuating means and to unwrap the copy sheet from the drum.

References Cited in the file of this patent

UNITED STATES PATENTS

| | | |
|---|---|---|
| 938,286 | Suren | Oct. 26, 1909 |
| 2,645,551 | Speecker | July 14, 1953 |
| 2,872,275 | Wise et al. | Feb. 3, 1959 |